United States Patent [19]

Kraus

[11] Patent Number: 4,953,742
[45] Date of Patent: Sep. 4, 1990

[54] PLASTIC SEALING COVER

[75] Inventor: Willibald Kraus, Grünstadt, Fed. Rep. of Germany

[73] Assignee: TRW United Carr GmbH & Co. KG, Enkenbach-Alsenborn, Fed. Rep. of Germany

[21] Appl. No.: 318,151

[22] Filed: Mar. 2, 1989

[30] Foreign Application Priority Data

Mar. 4, 1988 [DE] Fed. Rep. of Germany ....... 3807174

[51] Int. Cl.⁵ .................................................. B65D 39/00
[52] U.S. Cl. .................................... 220/367; 220/307; 220/DIG. 19
[58] Field of Search ........ 220/367, 306, 307, DIG. 19

[56] References Cited

U.S. PATENT DOCUMENTS

| | | | |
|---|---|---|---|
| 3,162,411 | 12/1964 | Duggan | 220/307 X |
| 4,334,632 | 6/1982 | Watanabe | 220/307 |
| 4,583,654 | 4/1986 | Pufpaff et al. | 220/DIG. 19 X |
| 4,646,932 | 3/1987 | Masler | 220/DIG. 19 X |
| 4,658,979 | 4/1987 | Mietz et al. | 220/367 X |
| 4,760,935 | 8/1988 | vanden Beld et al. | 220/307 |
| 4,801,040 | 1/1989 | Kraus | 220/307 |

*Primary Examiner*—Steven M. Pollard
*Attorney, Agent, or Firm*—Fay, Sharpe, Beall, Fagan, Minnich & McKee

[57] ABSTRACT

The disclosure is directed to a plastic sealing cover 1 for closing an opening in a panel or frame member. The cover includes a circumferential elastic sealing lip for pressing against one side of the panel. A holding stay 3 lies opposite the lip 2 for pressing against the other side of the panel. The lip 2 and the stay 3 are connected by a wall 11. The center of the cover is formed by a sealing zone 10 arched inwardly in a direction from the sealing lip toward the holding stay 3. Between the arched sealing zone 10 and the wall 11 there is provided at least one opening 5.

11 Claims, 1 Drawing Sheet

PLASTIC SEALING COVER

BACKGROUND OF THE INVENTION

The invention relates to a plastic sealing cover having a circumferential elastic sealing lip for pressing against one side of a support and a holding stay lying opposite the lip for pressing against the other side of the support. An arched sealing zone forms the center of the cover.

Already known, as state of the art, is such a plastic sealing cover designed so that a kind of cup form is given, while the arched sealing zone projects opposite the plane of the elastic sealing lip. (See British Patent No. 1,354,973. With this prior sealing cover, when an opening in a support, for example a motor vehicle body, is to be sealed, the arching of the sealing cover is effected after placing in the opening of the support. The arched sealing zone has, therefore, a clamping function. This known construction cannot be used where, for example, a drainage of water from the vehicle body is needed. For this purpose, so-called water drainage plugs are needed. These plugs are set into the body for ventilation of hollow spaces or for water drainage.

The purpose of the present invention, starting from the sealing cover of the kind mentioned before, is to design a construction in such a way that no water can penetrate from outside into the hollow spaces while, on the other hand, any water which may be present, for example, in the trunk, in the spare tire holder or inside the doors, can run out.

BRIEF SUMMARY OF THE INVENTION

This problem is solved, according to the invention, by the fact that, between the arched sealing zone and a wall connecting the sealing lip with the holding stay, at least one opening is provided, and that the sealing zone is arched opposite the plane of the holding stay. In this way, the advantage is produced that a good ventilation of hollow spaces is achieved in a simple way. It is also assured that no water can penetrate from outside into the interior of the car. The sealing zone has here the function, in cooperation with the openings, of letting any accumulated water run out.

The sealing cover may have, in this case, a round, angular, oval or other geometric forms. Running around the body of the sealing cover is a resilient lip for hermetic sealing. There is also provided, according to the invention, a holding stay which assures a perfect seal against the support, for example a floor of a motor vehicle body.

Above the sealing lip, according to the invention, is a projecting circumferential flange which prevents water, from the wind of driving, from being able to penetrate into the car body. In the inner zone of the sealing cover there is provided an arched sealing zone which is so designed that against it is sealed off at least one truncated cone section which runs to the openings. This zone is centered by stays and held against the wall of the sealing cover. The spaces between the truncated cone zone and the wall assure a perfect run-off of water.

In the lower zone of the sealing cover are placed one or more slits which, in turn, assure that any water which has penetrated from outside can run out again at once.

The form of the arching of the sealing zone is chosen so that the water, for example spray water, is conducted out again, while on the other hand, any water present in the interior of the car can automatically run out.

BRIEF DESCRIPTION OF THE DRAWINGS

The invention is described in detail below the preferred embodiment represented in the drawing wherein:

Referring more particularly to the drawings, FIGS. 1 and 2 illustrate the sealing cover 1 made of plastic and comprising a circumferential elastic sealing lip 2 and, lying opposite this, a relatively rigid and circumferentially extending holding stay 3. The sealing lip 2 as well as the holding stay 3 are connected with each other by a generally cylindrical side wall 11. The cylindrical wall 11 encloses a central arched sealing zone 10 which is so designed that the arching is directed inwardly in a direction from the holding stay 3. In other words, the arch extends away from the exterior of the cover when the cover is in the installed position shown in FIG. 3. Thus, a sort of H shape is given, while against the arching adjoins a truncated cone section 4. This arched sealing zone, according to FIGS. 1 and 2, is connected through four support stays 9, 9' with the wall 11 of the sealing cover 10. Between the four stays 9 and 9', there is provided in each case an opening 5 which has the form of a quarter circle. As can be seen, the stays 9, 9' are so shaped that they alternately have different widths. In the example of the preferred embodiment, the stays 9 have a greater width than the stays 9'.

In the zone of the wider stays 9, the circumferential holding stay 3 is interrupted in each case by a slit 6. As shown in FIG. 2, each slit 6 has a smaller width than the particular associated stay 9. The sealing lip 2 may also have a slit 7 in the zone of the slit 6. It can also be seen from FIG. 1 that preferably the sealing lip 2 is joined with a circumferential flange 8 that depends downwardly beneath the lower edge of the lip 2.

Figure 1:
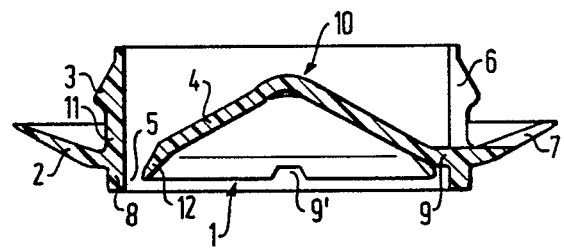
FIG. 1 shows a cross-section through a sealing cover along the line 1—1 in FIG. 2.

The construction, according to FIG. 1, is such that between the support 9 and 9', the truncated cone section 4 passes into another truncated cone section 12 which projects beyond the four stays in cup or basin form.

Figure 3:
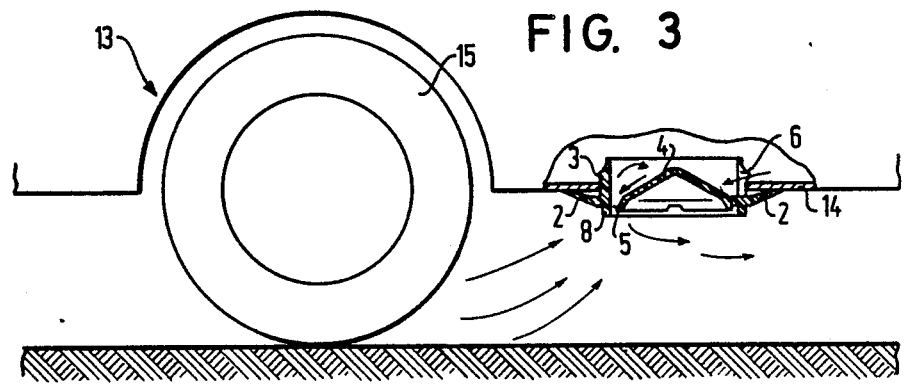
FIG. 3 shows an application of the sealing cover in schematic side view.

FIG. 3 represents the application of the sealing cover according to the invention. As shown diagrammatically, a motor vehicle 13 has a support or frame panel 14 provided with an opening into which the sealing cover 1 of the invention is installed from below. As can be seen, the sealing lip 2 is pressed against the panel about the opening in the support 14. The circumferential holding stay 3 serves as a counterbearing member and presses against the other side of the support 14. The circumferential flange 8 prevents water, which may be splashed up by a wheel 15, from being able to penetrate through the openings 5 into the inside of the vehicle body. If, however, a very slight residue of splash water should have entered, the truncated cone sections 4 and 12 of the sealing zone cause this water to immediately run out again through the openings 5.

If on the other hand there is water, for example, in the interior of the car, this water can pass through the slits 6 into the zone of the truncated cone section 4 for passage by this zone to the openings 5, and thus to the outside. Any residual water present can also run out through the slits 7. Also, any water present between the sealing lip 2 and the under side of the support 14 may, for example, also enter, through the slit 7 and the slit 6 into the zone of the truncated cone section 4, where it is conducted out by the latter, in turn, through the openings 5.

In this way, it is assured that water present, for example, in the trunk, in the spare tire holder or in the zone of the doors will be conducted to the outside through the slits 6 or 7, and the truncated cone section 4, as well as the openings 5.

Figure 2:
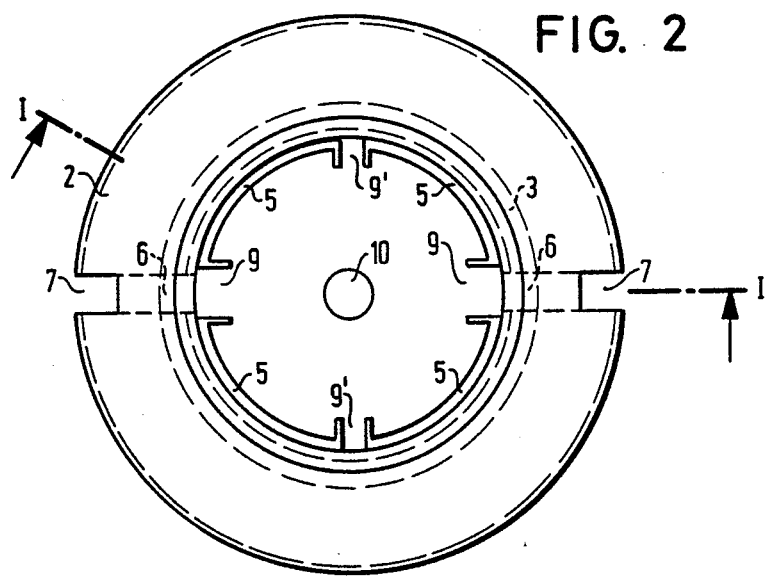
FIG. 2 is a bottom plan of the sealing cover according to FIG. 1.

There is given, in this way, according to FIG. 2, a cooperation between the form of execution of the slits 6 and 7, as well as the wider stays 9, so that the water from inside can pass out. On the other hand, any water splashed on from outside is prevented, through the wide stays 9, from entering into the slits 6 and 7. The projecting circumferential flange 8 also prevents water thrown against the body by travel wind from being able to penetrate into the latter.

In short, there is given in this way a simply constructed but very effective sealing cover which assures that no water can penetrate from outside into the interior spaces of the body but, on the other hand, any water present in the interior space is quickly and perfectly carried away.

The invention has been described with reference to preferred and alternate embodiments. Obviously, modifications and alterations will occur to others upon the reading and understanding of this specification. It is intended to include all such modifications and alterations insofar as they come within the scope of the appended claims or the equivalents thereof.

What is claimed is:

1. A sealing cover formed of plastic for closing an opening in a support panel and having a circumferential elastic sealing lip for pressing against one side of the support panel with a holding stay (3) lying opposite the sealing lip (2) for pressing against the other side of the support panel and an arched sealing zone forming the central portion of the cover, the improvement wherein a circumferential wall (11) connects the sealing lip (2) with the holding stay 3, and wherein between the arched sealing zone (10) and the wall (11) there is provided at least one opening (5) and the sealing zone (10) is arched in a direction from the sealing lip toward the holding stay (3).

2. A sealing cover according to claim 1, wherein the arched sealing zone (10) is fastened by several support stays (9, 9') to the wall (11) of the sealing cover (10) and wherein spaces between the support stays (9, 9') form the openings (5).

3. A sealing cover according to claim 2 wherein the sealing zone (4, 10) is held by four support stays (9, 9') joining the wall (11), while beneath two support stays (9) lying opposite each other are arranged two slits (6).

4. A sealing cover according to claim 3 wherein in the zone of the two slits (6) the sealing lip (2) has in each case a slit (7).

5. A sealing cover according to claim 2 wherein the holding stay (3) has at least one slit (6) in the zone of at least one of the support stays (9), between the circumferential wall (11) and the sealing zone (10).

6. A sealing cover according to claim 2 wherein the support stays (9, 9') have different widths.

7. A sealing cover according to claim 6 wherein the support stay (9) is wider than the slit (6).

8. A sealing cover according to claim 2 wherein two support stays (9, 9') of the same width lie opposite each other.

9. A sealing cover according to claim 2 the sealing lip (2) connects to a circumferential flange (8).

10. A sealing cover according to claim 1 wherein the arching of the sealing zone (10) connects to a truncated cone section (4), which extends to the openings (5).

11. A sealing cover according to claim 10 wherein between the support stays (9, 9') the truncated cone section (4) joins into another truncated cone section (12).

* * * * *